United States Patent [19]
Ede

[11] 3,903,917
[45] Sept. 9, 1975

[54] FLEXIBLE HOSE PIPES

[76] Inventor: Ainsley Neville Ede, 36 Thornton Way, Cambridge, England

[22] Filed: June 29, 1973

[21] Appl. No.: 374,978

[52] U.S. Cl............................ 137/355.12; 137/580
[51] Int. Cl.² ........................................ F16L 27/00
[58] Field of Search....................... 137/355.12, 580

[56] References Cited
UNITED STATES PATENTS

| | | | |
|---|---|---|---|
| 2,974,876 | 3/1961 | Poynor et al. ............. | 137/355.12 X |
| 3,011,502 | 12/1961 | Jordan ...................... | 137/580 X |
| 3,019,813 | 2/1962 | Dommann .................. | 137/580 |
| 3,217,725 | 11/1965 | Varian ...................... | 137/580 X |

*Primary Examiner*—Henry T. Klinksiek
*Attorney, Agent, or Firm*—Cushman, Darby & Cushman

[57] ABSTRACT

A longitudinally-seamed flexible hose-pipe capable of withstanding internal water pressure is formed from transversely-curled strip material having mutually engageable continuous longitudinal edge formations which when engaged couple the edges of the curled strip together to form a sealed longitudinal seam. The hose-pipe may be used in conjunction with a former device of a construction arranged to part locally the seam of a length of the flexible hose-pipe which is connected to a hydrant, so as to form a local leak in the seam through which water is withdrawn by the probe. In this arrangement a vehicle carrying the former and the probe can advance along the length of the hose-pipe, tapping off a supply of water through the progressively-advancing local leak produced by the former device as it moves along the length of the pipe. The steering of the machine may be controlled automatically by reference to the line of the hose-pipe so as to steer the machine along the length of the pipe.

3 Claims, 11 Drawing Figures

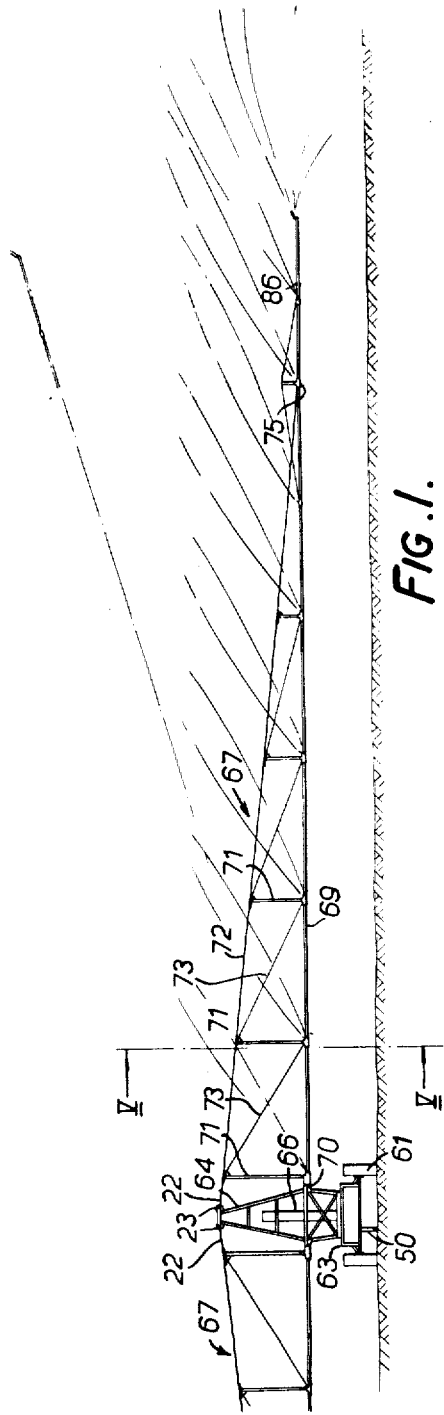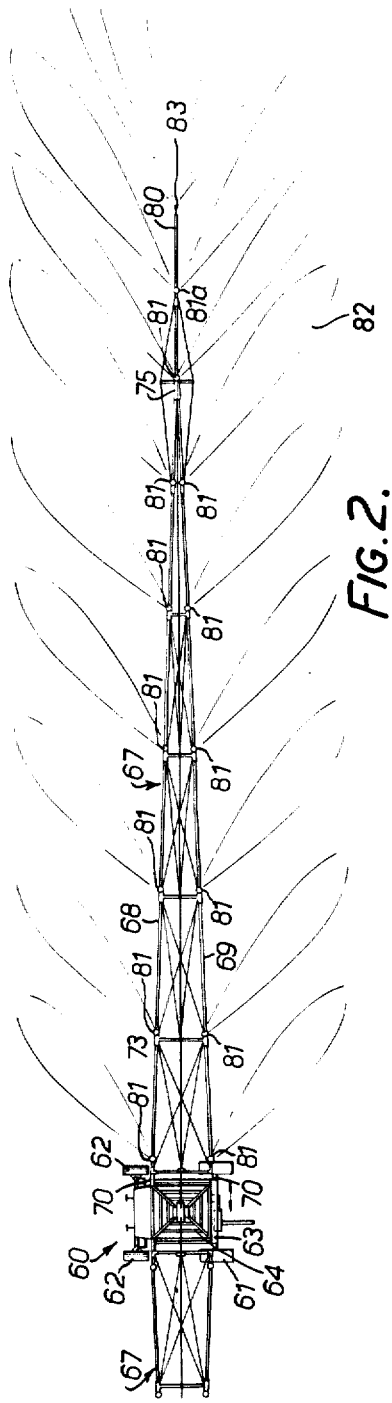

FLEXIBLE HOSE PIPES

SUMMARY OF THE INVENTION

The invention relates to a water supply system for a movable ground irrigator. A self-steering arrangement is disclosed wherein a seamed hose pipe is laid out longitudinally on the ground and connected to a supply of water at low pressure. A former device is advanced along the length of the laid-out hose pipe to create a local un-zipped opening in the seam through which water is withdrawn via a conduit, the un-zipped opening travelling along the length of the pipe as the former is advanced by the vehicle. The low pressure water withdrawn through the conduit via this opening is supplied to the inlet of a booster pump from which the water is delivered at increased pressure to whatever irrigation device or other water-consuming device is involved. For example, the booster pump may deliver the high pressure water to the irrigation booms of FIGS. 1 and 2.

The vehicle makes use of the laid-out hose pipe as a reference line for steering purposes, and makes use of the former device as a direction sensor to provide steering correction. The former device engages the laid-out hose pipe in sliding relationship in order to effect its unzipping and rezipping functions and create the advancing local opening. The former device is used as the sensor or direction feeler to provide steering correction command signals, which are supplied to a fully-servo-controlled power steering system which ensures that the vehicle is self-steering along the length of the laid-out hose pipe, which may be curved (see FIG. 7).

Thus, the invention provides a complete water supply system for a moving vehicle for irrigation or other purposes which enables a self-propelled irrigator to be moved slowly along a predetermined straight or curved line on the ground, steering itself by reference to the hose pipe through which it is supplied with the necessary irrigation water. The low pressure hose pipe is longitudinally seamed to provide the possibility of an advancing local leak, and is filled with water at low pressure only such as the longitudinal seam can stand without being burst open by excessive water pressure. The low pressure water is picked up via the former device and is delivered to the booster pump which augments its pressure as required for spray or sprinkler distribution over a very large area of ground. The laid-out hose pipe itself provides a direction reference which the vehicle has to follow, and the former device, which is already in sliding engagement with the hose, is used as a source of steering command signals to enable the vehicle to be completely self-steering. A fully-servo-controlled power steering system is provided, to which the steering corrections from the sliding sensor are fed to ensure that the vehicle follows accurately along the line of the hose.

The steering means may comprise a forwardly-extending pivoted steering arm which is operatively coupled to the steered wheels of the vehicle for steering purposes, the steering arm carrying the former device which is slidable along and in contact with the hose-pipe. Thus the line of the seamed pipe laid on the ground defines the path which the vehicle will follow.

The invention may be carried into practice in various ways, but certain specific embodiments will now be described by way of example only, with reference to the accompanying drawings in which:

FIG. 1 is a diagrammatic front elevation of a power-driven irrigation machine,

FIG. 2 is a plan of the machine of FIG. 1,

Figure 5:
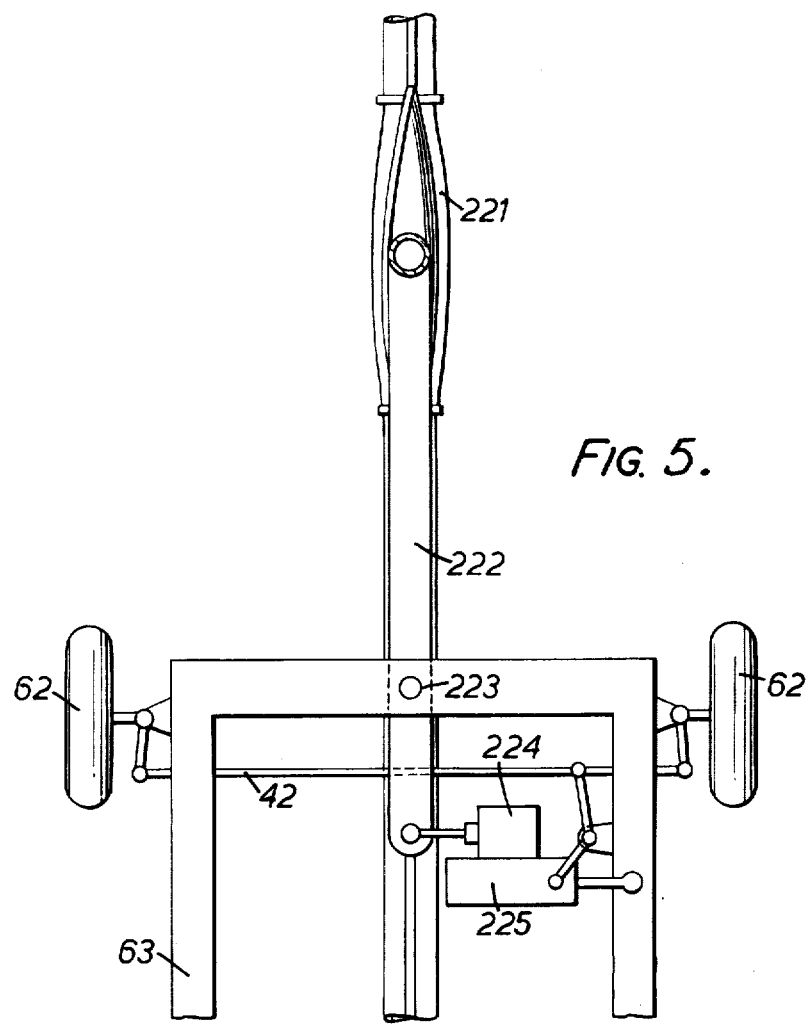
Figure 3:
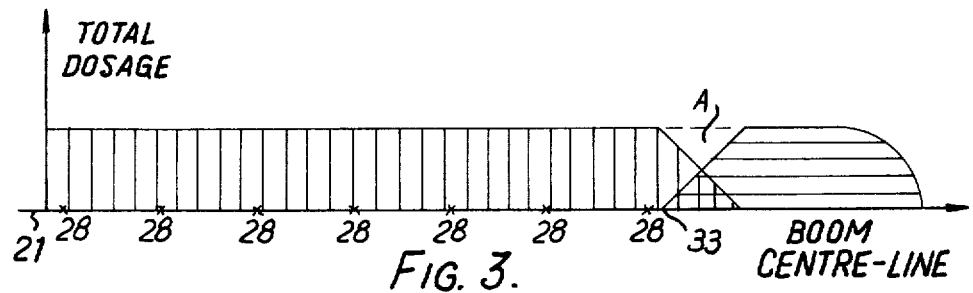
Figure 4:
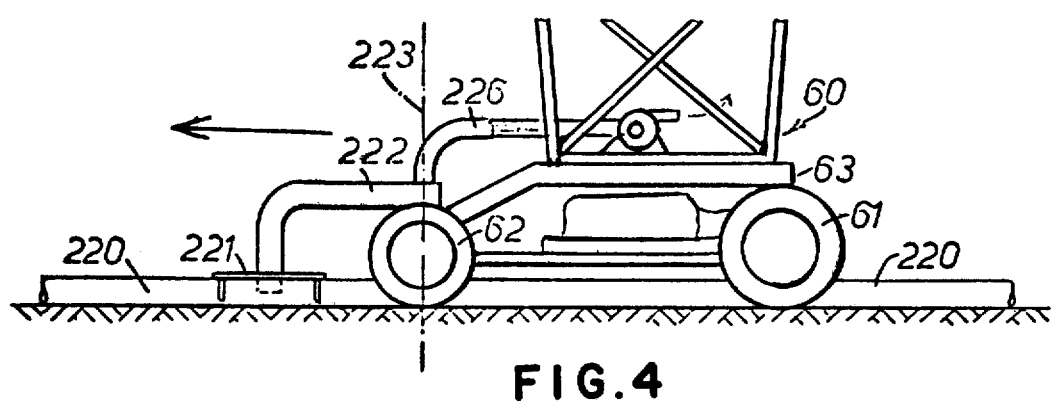
Figure 6:
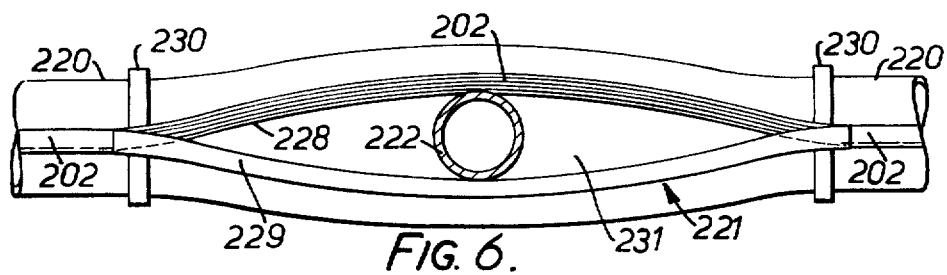
Figure 7:
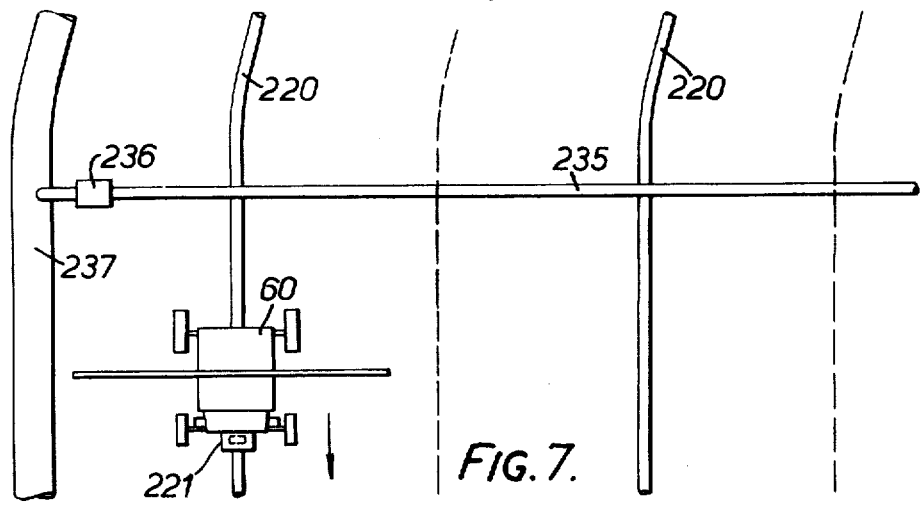
Figure 8:
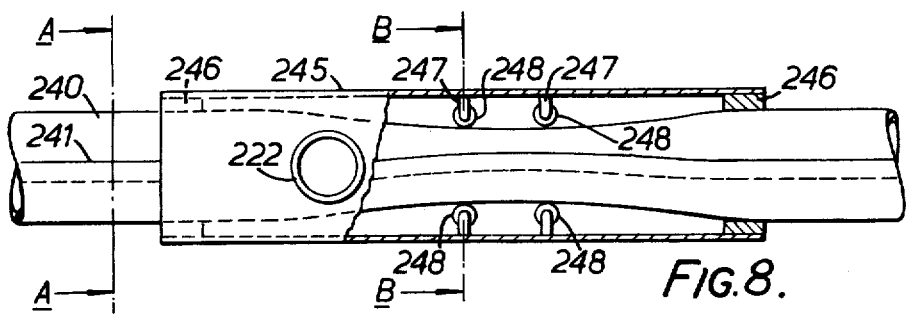
Figure 9:
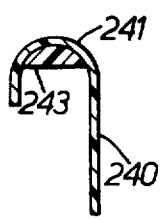
Figure 10A:
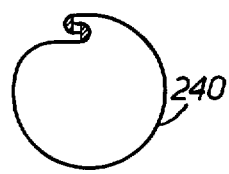

FIG. 3 is a diagram showing the total water dosage distribution along a line at right angles to the direction of travel of the machine, FIG. 4 is a side elevation, in diagrammatic form, of a machine with a follower device for steering the machine along a seamed pipe laid on the ground, and for drawing water from a progressively-advancing opening in the seam formed by the follower device, FIG. 5 shows diagrammatically in plan how the follower device and pivoted probe of FIG. 4 are coupled to the steering of the machine, FIG. 6 is a plan on a larger scale of the follower device of FIG. 4, FIG. 7 is a plan of an area of ground provided with laid seamed pipes for supplying a machine having a follower attachment according to FIGS. 4 to 6, FIG. 8 is a plan of a modified form of follower device, FIG. 9 is an enlarged fragmentary view of one edge of a resilient strip for forming into a seamed pipe by means of the device of FIG. 8, and FIGS. 10a and 17b are diagrams showing the cross-section of the seamed pipe at the lines A—A, and B—B, in FIG. 8.

FIGS. 1 and 2 show a movable wheeled carriage 60 which is caused to travel in a predetermined path over an area of ground to be irrigated and delivers water in a controlled spray pattern during its travel, the water being supplied from hydrants distributed over the ground area, to which the machine is successively connected by a flexible hose.

The irrigation machine 60 is self-propelled, being provided with driven rear wheels 61 and nondriven steerable front wheels 62. The rear wheels 61 are driven by a prime mover such as an i.c. engine mounted on the chassis 63 of the machine, and the front wheels 62 are provided with a guidance system for automatic steering, which will be described later.

The tower 64 of the machine, which is rotatably mounted on the chassis 63 for rotation about the vertical post 66, carries a pair of elongated booms 67 each of which is of generally triangular cross section. Thus the lower part of each boom 67 comprises a pair of converging rigid pipes 68 and 69 pivoted at their inner ends to pivots 70 on the side of the tower 64, the pipes 68 and 69 being provided with bracing triangles 71 at intervals along their lengths as shown, and the apices of the bracing triangles being joined by a tensioning cable 72 and appropriate bracing wires 73 to form a stiff lattice-work structure. At their convergent outer ends the leading and trailing pipes 68 and 69 are joined by a fitting 75 which also carries a short extension pipe 80.

The inner end of each boom 67 is pivoted about a horizontal axis pivot at 70 to the tower 14, and a cable 22 is connected to the upper end of the innermost triangle 71 and is led over a pulley 23 at the top of the tower and down through the tower framework to a winch or hydraulic ram (not shown) which enables the whole boom 67 to be swung upwardly from a horizontal or near-horizontal position to a maximum angle of tilt of about 20° to the horizontal. Fixed or rotating sprinkler nozzles 81 are mounted at spaced points along the lengths of the two pipes 68 and 69, and direct feathers of sprayed water outwardly and upwardly in directions inclined to the general length of each boom 67, as indicated at 82 in FIG. 2. In addition a tip spray nozzle 83 is mounted on the outer end of the extension pipe 80. The calibration and arrangement of the sprinklers 81 and tip nozzles 83 are such that their spray patterns overlap to give a substantially uniform water dosage rate over the sprayed strip of ground in a complete pass of the machine. The sprinklers 81 near to the carriage 10 are arranged so as to avoid wetting the ground in the track of the moving machine, it being preferable to keep this ground hard so that the wheels of the machine will not sink in or slip.

The tip nozzles 83 (which oscillate about a vertical axis) direct jets or sprays of water in the direction of the lengths of the booms and generally upwardly, i.e. laterally with respect to the path of movement of the machine 60, in a spray of up to 90° cone angle, thereby increasing correspondingly the width of the strip of ground which is sprayed by each boom during the movement of the carriage.

The sprinklers 81 and 83 are so calibrated and arranged on the booms that their spraying patterns overlap one another as the machine advances, and so that the total water dosage delivered to every unit of ground area in the strip sprayed by the machine in a single pass is approximately uniform. This is indicated diagrammatically in FIG. 3, which is a graph of the total water dosage per unit area, plotted against the boom length. It will be observed that in the region A in FIG. 3 the dosage due to the sprinklers 81 is supplemented by that due to the tip nozzle 83 through the overlapping of their spray patterns, and that as a result approximate uniformity of total distribution is achieved, apart from the narrow path over which the machine passes and onto which spraying is deliberately avoided.

Moreover, means is provided for causing the tower 64 and both booms 67 to oscillate angularly about the vertical pivotal axis of the tower through an angle of about 30°. The oscillation of the tower and two booms is produced mechanically by means such as a cyclically-actuated hydraulic ram (not shown) acting between the chassis 63 and the tower 64.

In the forward direction, water distribution is maintained constant by causing the machine to move forwards at a steady speed, which may be in the region of 16 to 64 metres per hour, and can be adjusted as one means of controlling the water application rate.

For transport purposes, the tower 64 is rotated about the post 66 until the booms extend parallel to the fore-and-aft axis of movement of the carriage.

Other details of the machine 60 are fully described in my copending patent application Ser. No. 374,972, filed June 29, 1973, and will not be further described herein.

One arrangement employing zip-up seamed pipe is illustrated in FIGS. 4 to 6. In this case a large-diameter ready-seamed hosepipe 220, formed of flexible strip 200 with edge mouldings 201, 202, is laid down in tubular form on the ground along the required path of the machine 60 during a run, and is connected to a water supply to fill the pipe, and the filled pipe is used as a reference to guide the steering of the machine to follow the length of the pipe. A guide collar device 221 surrounds the pipe 220 and is carried by a forwardly-extending tubular probe 222 pivoted near its rear end about a vertical swivelling axis 223 to the machine 60. The probe actuates the control valve 224 (FIG. 5) of a hydraulic steering ram 225 coupled to the steering linkage 42 of the machine in a manner providing a positional feedback, so that the guide collar 221 as it follows the pipe 220, operates an automatic steering control of the vehicle causing it to follow the length of the pipe. The collar 221 also incorporates a double-zip device which progressively unfastens the seam joint between the mouldings 201, 202 to allow the probe 222 access to the interior of the pipe 220, and then reconnects the seam beyond the probe, as the collar slides along the length of the pipe. A booster pump 226 mounted on the moving machine 60 and driven by its engine has its inlet connected by a pipe 227 to the downstream end of the probe so that the upstream end of the probe draws out water from the interior of the pipe 220 through the opened-up (de-zipped) portion of the seam.

The collar 221 comprises a pair of opposed channel-section guide tracks 228, 229 which diverge from an overlapping position at the front end of the collar, pass one on either side of the downswept end of the probe 222, and then converge again to an overlapping position at the rear end of the collar. At their overlapping ends the guide tracks are secured to rings 230 which slidably surround the seamed pipe 220. Thus as the collar 221 is advanced along the pipe 220, with the guide tracks in slidable engagement with the protruberant backs of the mouldings 201, 202, the seam is first progressively unzipped in front of the probe and then reconnected behind it. The space between the separated portions of the guide tracks 228 and 229 is closed by a plate 231 sealed around the probe 222.

FIG. 7 shows a typical installation using this form of water supply to the machine 60. Seamed hoses 220 are laid on the ground at suitable spacings, say 120 metres, along the centre lines of adjacent required runs of the machine, and are all connected to a feeder main 235 connected to the outlet of a low-pressure pump 236 which draws water from a stream, canal or other source 237 and supplies it at say 15 p.s.i. to the feeder main and seamed pipes. The machine 60 is driven along each pipe 220 in turn with the collar 221 engaged with following the pipe to steer the machine, and draws water from the unzipped portion of the seam within the collar. The water is delivered by the booster pump 226 at 60 p.s.i. to the boom sprinklers and jets for distribution to the strip of ground on either side of the pipe 220.

This arrangement has the advantage that the seamed pipes can be laid on the ground and can remain in position semi-permanently, and themselves provide the necessary references for automatic steering of the machine 60. Moreover, once again, the pipes 220 can be of larger diameter than could be handled conveniently when full. Each of the seamed pipes 220 could be say 22.5 cm in diameter and up to 650 metres long, and with a pressure drop of only 7 p.s.i. per 325 metres could supply a 300 acre strip of ground. The arrangement thus provides an economical water supply distribution system for a large area, operating at 15 p.s.i. in the distribution hoses in combination with a pressure booster pump on each machine.

Figure 10B:
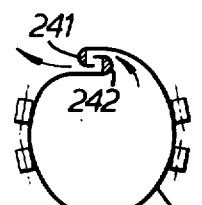

FIGS. 8 to 10 show a modified form of seamed pipe and a modified form of follower collar which can be used in an arrangement similar to that of FIGS. 4 to 6. In this case the seamed pipe 240 is made of a hard, springy plastics strip material, for example that sold under the trade name VYBAK, having preformed curled-over edge formations 241, 242 on its longitudinal edges, as shown in section in FIG. 9, which hook together as shown in FIG. 10a to form the seam joint of the hose and are held in engagement by the resilience of the strip material aided by the internal water pressure. A resilient sealing strip 243 is located in one or each edge formation for sealing engagement with the extreme edge of the other formation.

The collar comprises a tubular sleeve 245 surrounding the pipe 240 and provided with annular seals 246 at each end which engage with the exterior of the pipe. Journalled on brackets 247 in the interior of the sleeve are pairs of pressure rollers 248 which engage the exterior of the pipe within the sleeve on either side of the seam and press the pipe walls inwardly, i.e. together, thus locally disconnecting the seam to create a leak (see FIG. 10b) through which water is drawn by the suction of the booster pump acting via the probe 222. This arrangement relies on the resilience of the plastics strip material, aided by the internal water pressure, to ensure that the seam is re-established before the pipe leaves the sleeve.

It is possible to dispense with the booms of the machine 60 altogether, and to provide the required degree of lateral spread of the sprayed water on each side of the main carriage by the use of suitable jets directed from rain guns mounted on the carriage.

The apparatus could also be used to supply liquid or powder nutrients or medicaments such as insecticides, herbicides or fungicides to a crop, and thus although the invention has been described principally with reference to irrigation, it is to be appreciated that the apparatus can be used to distribute these other fluid materials as well. Chemicals can be metered directly into the water supply, or the machine could carry a supply of the chemical and meter it into the water being distributed through the booms on the machine.

What I claim as my invention and desire to secure by Letters Patent is:

1. A water supply system for a movable ground irrigator vehicle, which comprises:

a longitudinally-seamed hose pipe formed of a length of strip material whose longitudinal edges have mutually-interengageable continuous longitudinal edge formations, the strip material being curled longitudinally transversely to its length with said edge formations inter-engaged to form a substantially watertight seam extending along substantially the whole length of the hose pipe, the seamed hose pipe being laid out on the ground along a predetermined line and being connected to a supply of water under low pressure whereby the seamed hose pipe is filled with water and inflated by the internal low water;

a movable ground irrigator vehicle with steerable ground wheels;

propelling means on the vehicle for moving said vehicle in a direction along the length of the laid-out hose pipe;

a former device carried by the vehicle for movement therewith, said former device having a leading end and a rear end and being engaged with said inflated hose pipe in longitudinally-slidable relationship therewith;

said former device including means which firstly coact with the said edge formations of the seamed pipe to progressively disengage and part said ecges adjacent to the leading edge of the former deivce, and which then coact with said edge formations to progressively bring together and re-engage said edges adjacent the rear end of the former device, thereby producing between the said front and rear ends of the former device a local opening in said seam, said local opening travelling progressively along the length of the hose pipe together with the former device and between said front and rear ends thereof as the vehicle travels along the laid-out hose pipe;

a booster pump mounted on said vehicle and having a water inlet and a delivery outlet;

conduit means carried by said vehicle and connected at its one ned to the water inlet of the pump and at its other end to the former device between said leading and rear ends thereof, said conduit withdrawing water from the interior of the hose pipe through said local opening in the seam and supplying said withdrawn water to the inlet of the pump for delivery at increased pressure from the delivery outlet of the pump;

the vehicle being provided with a servo-controlled power steering system coupled to its steerable wheels and arranged to steer said wheels in response to steering command signals supplied to said system;

the former device being movably mounted on the vehicle in directions transverse thereto;

guide means carried by the vehicle and sensitive to relative transverse displacements between the former device and the vehicle as the advancing vehicle move the former device along the length of the laid-out hose pipe, said guide means including means for generating input signals corresponding to said relative transverse displacements and for supplying these input signals to said servo-controlled power steering system, whereby steering corrections are applied by said system to the steerable ground wheels to cause the advancing vehicle to follow the line of the laid-out hose pipe while advancing therealong and drawing water therefrom through said local opening between the leading and rear ends of said former device.

2. The water supply system of claim 1, wherein:

the coacting means of the former open the seamed pipe by expanding the seamed pipe to part the edges and then close the seamed pipe by contracting the seamed pipe until the edges are re-engaged, and the conduit means includes a probe which enters the interior of the hose pipe through said local opening to remove water therefrom.

3. The water supply system of claim 1 wherein:

the coacting means of the former open the seamed pipe by contracting the seamed pipe to part the edges and then close the seamed pipe by permitting the seamed pipe to expand until the edges are re-engaged, and the conduit means includes a tubular sleeve which exteriorly jackets the hose pipe at the site of the local opening, and includes means annularly sealing the tubular sleeve with the hose pipe upstream and downstream of the local opening, whereby water which leaks through the local opening is collected in the jacket of the conduit means.

* * * * *